United States Patent
Yamada et al.

(10) Patent No.: US 9,833,852 B2
(45) Date of Patent: Dec. 5, 2017

(54) WIRE ELECTRICAL DISCHARGE MACHINING DEVICE

(75) Inventors: Kuniharu Yamada, Kanagawa (JP); Masaki Kougo, Kanagawa (JP); Tomoyuki Yanagisawa, Kanagawa (JP)

(73) Assignee: SODICK CO., LTD., Kanagawa (JP)

( * ) Notice: Subject to any disclaimer, the term of this patent is extended or adjusted under 35 U.S.C. 154(b) by 1266 days.

(21) Appl. No.: 13/880,053

(22) PCT Filed: Oct. 19, 2011

(86) PCT No.: PCT/JP2011/074076
§ 371 (c)(1),
(2), (4) Date: May 30, 2013

(87) PCT Pub. No.: WO2012/053568
PCT Pub. Date: Apr. 26, 2012

(65) Prior Publication Data
US 2013/0240486 A1    Sep. 19, 2013

(30) Foreign Application Priority Data

Oct. 19, 2010  (JP) .................................. 2010-234340

(51) Int. Cl.
*B23H 7/10* (2006.01)
*B23H 1/02* (2006.01)

(52) U.S. Cl.
CPC .............. *B23H 7/104* (2013.01); *B23H 1/02* (2013.01)

(58) Field of Classification Search
CPC .......... B23H 7/104; B23H 1/02; B23H 7/065; B23H 7/06; B23H 7/20; B23H 2500/20;
(Continued)

(56) References Cited

U.S. PATENT DOCUMENTS 3,120,619 A * 2/1964 Webb ..................... B23H 1/022
                                                     219/69.13
3,648,338 A * 3/1972 Mruk ..................... D02H 13/00
                                                     242/155 R
(Continued)

FOREIGN PATENT DOCUMENTS

JP       61-125734      6/1986
JP       62-124827      6/1987
(Continued)

OTHER PUBLICATIONS

"International Search Report (Form PCT/ISA/210)", published on Jan. 24, 2012, with English translation thereof, p. 1-p. 8.

*Primary Examiner* — Eric Stapleton
(74) *Attorney, Agent, or Firm* — JCIPRNET (57) ABSTRACT

Provided is a wire electrical discharge machining device which has a tension controller for maintaining the tension of a traveling wire electrode at a tension. The tension controller includes: an allowed tension calculation module for determining an allowed tension that is less than a wire breaking tension at which the wire electrode breaks; and a set tension generation module for generating the set tension in accordance with the allowed tension. When the set tension is greater than the allowed tension, the set tension generation module reduces the set tension. When the set tension is less than the allowed tension, the set tension generation module increases the set tension in such a way that the set tension does not exceed the allowed tension.

15 Claims, 5 Drawing Sheets

(58) Field of Classification Search
CPC ......... B23H 7/04; B23H 1/00; B23H 11/003;
B23H 7/08; B23H 1/022; B23H 2200/00;
G05B 19/4086; G05B 2219/33263
USPC ........... 219/9.12, 69.13, 69.14, 69.15, 69.16,
219/69.17, 69.18, 69.19, 69.2, 69.12
See application file for complete search history.

(56) References Cited

U.S. PATENT DOCUMENTS

| | | | | |
|---|---|---|---|---|
| 3,822,374 A * | 7/1974 | Ullmann | ................ | B65H 59/38 219/69.12 |
| 4,004,123 A * | 1/1977 | Inoue | ..................... | B23H 1/022 219/69.13 |
| 4,263,116 A * | 4/1981 | Inoue | ..................... | B23H 7/10 204/224 M |
| 4,298,781 A * | 11/1981 | Inoue | ..................... | B23H 7/104 219/69.12 |
| 4,301,349 A * | 11/1981 | Inoue | ..................... | B23H 7/38 219/69.12 |
| 4,329,558 A * | 5/1982 | Martin | ..................... | B23H 7/04 219/69.12 |
| 4,414,457 A * | 11/1983 | Nomura | ..................... | B23H 7/10 204/206 |
| 4,431,894 A * | 2/1984 | Inoue | ..................... | B23H 7/102 219/69.12 |
| 4,480,799 A * | 11/1984 | Yano | ..................... | H01F 41/094 242/412 |
| 4,495,393 A * | 1/1985 | Janicke | ................. | B23H 7/101 219/69.12 |
| 4,499,359 A * | 2/1985 | Obara | ..................... | B23H 7/065 219/69.12 |
| 4,520,253 A * | 5/1985 | Gamo | ..................... | B23H 7/065 219/69.12 |
| 4,521,662 A * | 6/1985 | Kinoshita | ............. | B23H 7/065 219/69.12 |
| 4,523,074 A * | 6/1985 | Okuda | ..................... | B23H 7/10 219/69.1 |
| 4,546,227 A * | 10/1985 | Gamo | ..................... | B23H 7/065 219/69.12 |
| 4,559,601 A * | 12/1985 | Kishi | ..................... | G05B 19/41 219/69.12 |
| 4,598,189 A * | 7/1986 | Inoue | ..................... | B23H 7/102 204/206 |
| 4,622,450 A * | 11/1986 | Kinoshita | ............. | B23H 7/065 219/69.12 |
| 4,652,717 A * | 3/1987 | Briffod | ..................... | B23H 7/04 219/69.12 |
| 4,667,078 A * | 5/1987 | Kilcher | ................. | B23H 7/104 204/206 |
| 4,673,788 A * | 6/1987 | Buchler | ................. | B23H 7/06 204/206 |
| 4,675,491 A * | 6/1987 | Marendaz | ............... | B23H 7/04 219/69.12 |
| 4,703,146 A * | 10/1987 | Kinoshita | ............. | B23H 7/065 219/69.12 |
| 4,713,517 A * | 12/1987 | Kinoshita | ............. | B23H 7/065 219/69.12 |
| 4,736,086 A * | 4/1988 | Obara | ..................... | B23H 7/06 219/69.12 |
| 4,748,310 A * | 5/1988 | Aso | ..................... | B23H 7/10 219/69.12 |
| 4,777,340 A * | 10/1988 | Kobayashi | ........... | B23H 11/003 219/69.1 |
| 4,783,583 A * | 11/1988 | Obara | ..................... | B23H 7/10 204/206 |
| 4,786,992 A * | 11/1988 | Tajima | ..................... | G11B 15/43 242/334.4 |
| 4,801,779 A * | 1/1989 | Obara | ..................... | B23H 7/065 219/69.12 |
| 4,806,720 A * | 2/1989 | Obara | ..................... | B23H 7/065 219/69.12 |
| 4,814,572 A * | 3/1989 | Aso | ..................... | B23H 7/10 219/69.12 |
| 4,816,636 A * | 3/1989 | Obara | ..................... | B23H 7/10 204/206 |
| 4,818,848 A * | 4/1989 | Obara | ..................... | B23H 7/102 219/69.12 |
| 4,877,935 A * | 10/1989 | Aso | ..................... | B23H 7/10 219/69.12 |
| 4,929,810 A * | 5/1990 | Kawase | ..................... | B23H 7/10 140/139 |
| 4,931,614 A * | 6/1990 | Sumita | ..................... | B23H 7/06 219/69.12 |
| 4,963,711 A * | 10/1990 | Obara | ..................... | B23H 7/04 219/69.12 |
| 4,978,828 A * | 12/1990 | Umetsu | ..................... | B23H 7/10 219/69.12 |
| 4,985,608 A * | 1/1991 | Morishita | ............. | B23H 7/065 219/69.12 |
| 5,001,321 A * | 3/1991 | Iwasaki | ................. | B23H 7/102 219/69.12 |
| 5,003,147 A * | 3/1991 | Kawanabe | ............. | B23H 7/06 219/69.12 |
| 5,006,691 A * | 4/1991 | Nakayama | ............. | B23H 7/065 219/69.12 |
| 5,006,692 A * | 4/1991 | Magara | ................. | B23H 7/102 219/69.12 |
| 5,019,684 A * | 5/1991 | Ito | ..................... | B23H 7/10 219/69.12 |
| 5,023,420 A * | 6/1991 | Aso | ..................... | B23H 7/104 219/69.12 |
| 5,045,662 A * | 9/1991 | Yamada | ................. | B23H 7/10 219/69.12 |
| 5,051,553 A * | 9/1991 | Kinoshita | ............. | B23H 7/02 219/69.12 |
| 5,055,649 A * | 10/1991 | Iwasaki | ................. | B23H 7/102 219/69.12 |
| 5,113,051 A * | 5/1992 | Sakaue | ................. | B23H 7/101 219/69.12 |
| 5,118,914 A * | 6/1992 | Girardin | ................. | B23H 7/26 219/69.11 |
| 5,142,116 A * | 8/1992 | Yokomichi | ............. | B23H 7/10 219/69.12 |
| 5,144,212 A * | 9/1992 | Izawa | ..................... | B23H 7/20 318/569 |
| 5,162,631 A * | 11/1992 | Hachisuka | ............. | B23H 1/022 219/69.12 |
| 5,166,490 A * | 11/1992 | Morishita | ............. | B23H 7/104 219/69.12 |
| 5,200,906 A * | 4/1993 | Yamashita | ......... | G05B 19/4099 219/69.12 |
| 5,216,217 A * | 6/1993 | Morishita | ............. | B23H 7/104 219/69.12 |
| 5,237,145 A * | 8/1993 | Magara | ..................... | B23H 7/10 219/69.12 |
| 5,268,551 A * | 12/1993 | Kawanabe | ............. | B23H 7/10 219/69.12 |
| 5,268,552 A * | 12/1993 | Onzuka | ..................... | B23H 7/10 219/69.12 |
| 5,288,966 A * | 2/1994 | Kawanabe | ............. | B23H 7/10 219/69.12 |
| 5,302,796 A * | 4/1994 | Kuriki | ..................... | B23H 7/10 219/69.12 |
| 5,306,888 A * | 4/1994 | Kaneko | ..................... | B23H 7/04 219/69.12 |
| 5,306,889 A * | 4/1994 | Kaneko | ..................... | B23H 7/04 219/69.12 |
| 5,324,909 A * | 6/1994 | Derighetti | ................ | B23H 7/10 219/69.12 |
| 5,338,912 A * | 8/1994 | Iwasaki | ................. | B23H 7/10 219/69.12 |
| 5,359,169 A * | 10/1994 | Kaneko | ..................... | B23H 7/04 219/69.13 |
| 5,422,455 A * | 6/1995 | Sato | ..................... | B23H 7/04 219/69.12 |
| 5,506,381 A * | 4/1996 | Matsushima | ........... | B23H 7/10 206/388 |

(56) References Cited

U.S. PATENT DOCUMENTS

| | | | | |
|---|---|---|---|---|
| 5,519,181 A | * | 5/1996 | Hsu | B23H 7/06 219/69.12 |
| 5,556,551 A | * | 9/1996 | Matsushima | B23H 7/10 219/69.12 |
| 5,556,554 A | * | 9/1996 | Morishita | B23H 7/02 219/69.12 |
| 5,603,851 A | * | 2/1997 | Noda | B23H 7/102 219/69.12 |
| 5,603,852 A | * | 2/1997 | Goto | B23H 1/02 219/69.13 |
| 5,744,775 A | * | 4/1998 | Yasuda | B23H 7/04 219/69.12 |
| 5,770,831 A | * | 6/1998 | Kaneko | B23H 1/022 219/69.18 |
| 5,810,235 A | * | 9/1998 | Hoynant | B41F 33/18 226/1 |
| 5,834,726 A | * | 11/1998 | Drouet | B23H 7/065 219/69.12 |
| 5,852,269 A | * | 12/1998 | Toyonaga | B23H 7/065 219/69.12 |
| 5,872,347 A | * | 2/1999 | Li | B23H 7/04 219/69.12 |
| 5,903,067 A | * | 5/1999 | Sato | B23H 1/022 219/69.11 |
| 5,922,220 A | * | 7/1999 | Beltrami | B23H 7/065 219/69.12 |
| 6,008,461 A | * | 12/1999 | Iezawa | B23H 1/02 219/69.12 |
| 6,028,282 A | * | 2/2000 | Toyonaga | B23H 7/104 219/69.12 |
| 6,130,510 A | * | 10/2000 | Kurihara | B23H 1/022 219/69.13 |
| 6,140,600 A | * | 10/2000 | Kaneko | B23H 1/022 219/69.12 |
| 6,326,577 B1 | * | 12/2001 | Toyonaga | B23H 7/104 219/69.12 |
| 6,501,232 B1 | * | 12/2002 | Goto | B23H 1/022 219/69.13 |
| 6,505,091 B1 | * | 1/2003 | Imai | B23H 7/16 219/69.16 |
| 6,612,043 B2 | * | 9/2003 | Tsai | B23H 7/065 219/69.12 |
| 6,747,237 B2 | * | 6/2004 | Arakawa | B23H 7/065 219/69.12 |
| 6,787,727 B2 | * | 9/2004 | Yamada | B23H 7/102 219/69.12 |
| 6,836,741 B2 | * | 12/2004 | Liang | B23H 7/065 219/69.17 |
| 6,921,876 B2 | * | 7/2005 | Okuda | B23H 7/101 219/69.12 |
| 6,958,460 B2 | * | 10/2005 | Martin | B23H 1/022 219/69.13 |
| 6,984,800 B2 | * | 1/2006 | Abe | B23H 7/02 219/69.12 |
| 7,045,735 B2 | * | 5/2006 | Satou | B23H 7/04 219/69.13 |
| 7,054,712 B2 | * | 5/2006 | Murai | B23H 7/065 219/69.11 |
| 7,113,884 B1 | * | 9/2006 | Yuzawa | B23H 1/022 219/69.16 |
| 7,211,762 B2 | * | 5/2007 | Kinoshita | B23H 7/04 219/69.12 |
| 7,294,806 B2 | * | 11/2007 | Martin | B23H 7/065 219/69.12 |
| 7,744,775 B2 | * | 6/2010 | Yang | C09K 5/20 106/14.05 |
| 7,795,558 B2 | * | 9/2010 | Nakajima | B23H 1/10 219/69.14 |
| 7,852,031 B2 | * | 12/2010 | Hon | G05B 19/402 318/572 |
| 7,919,721 B2 | * | 4/2011 | Hayashi | B23H 7/065 219/69.12 |
| 8,679,575 B2 | * | 3/2014 | Biggs | H01L 41/0986 427/58 |
| 8,704,132 B2 | * | 4/2014 | Artelsmair | B23K 9/124 219/121.11 |
| 8,907,243 B2 | * | 12/2014 | Watanabe | B23H 7/10 219/69.12 |
| 9,126,277 B2 | * | 9/2015 | Matsunaga | B23H 1/022 219/69.12 |
| 2002/0184777 A1 | * | 12/2002 | Tsai | B23H 7/065 33/502 |
| 2003/0010753 A1 | * | 1/2003 | Yamada | B23H 7/102 219/69.12 |
| 2003/0042228 A1 | * | 3/2003 | Arakawa | B23H 7/065 219/69.12 |
| 2004/0118892 A1 | * | 6/2004 | Weber | A61F 13/15772 226/44 |
| 2004/0238498 A1 | * | 12/2004 | Okuda | B23H 7/101 219/69.12 |
| 2005/0072760 A1 | * | 4/2005 | Abe | B23H 7/02 219/69.12 |
| 2006/0070986 A1 | * | 4/2006 | Ihde | B23K 9/1336 219/137.71 |
| 2006/0102596 A1 | * | 5/2006 | Kinoshita | B23H 7/04 219/69.12 |
| 2006/0219667 A1 | * | 10/2006 | Martin | B23H 7/065 219/69.12 |
| 2008/0047936 A1 | * | 2/2008 | Hayashi | B23H 7/065 219/69.12 |
| 2008/0217300 A1 | * | 9/2008 | Kita | B23H 7/104 219/69.12 |
| 2008/0283653 A1 | * | 11/2008 | Bing-Wo | B65H 49/16 242/410 |
| 2012/0312786 A1 | * | 12/2012 | Arakawa | B23H 7/06 219/69.11 |

FOREIGN PATENT DOCUMENTS

| | | |
|---|---|---|
| JP | 03-035933 | 2/1991 |
| JP | 06-055359 | 3/1994 |
| JP | 09-225749 | 9/1997 |
| JP | 10-309631 | 11/1998 |
| JP | 2003-266247 | 9/2003 |

* cited by examiner

Amean: average gap current
n: number of electrical discharge
s: comsumed cross-sectional area of wire electrode

FIG. 3

Amean: average gap current
WS: travelling speed of wire electrode

WIRE ELECTRICAL DISCHARGE MACHINING DEVICE

CROSS-REFERENCE TO RELATED APPLICATION

This application is a 371 application of an international PCT application serial no. PCT/JP2011/074076, filed on Oct. 19, 2011, which claims the priority benefit of Japan application no. 2010-234340, filed on Oct. 19, 2010. The entirety of each of the above-mentioned patent applications is hereby incorporated by reference herein and made a part of this specification.

TECHNICAL FIELD

The present invention relates to a wire electrical discharge machining device for machining a work by generating electrical discharge in a gap ("machining gap") formed between a wire electrode and the work. In particular, the present invention relates to a wire electrical discharge machining device for controlling a tension applied to a wire electrode traveling along a wire transportation path.

BACKGROUND TECHNIQUE

In general, during machining, a wire electrode is transported between a pair of wire guides in a direction substantially vertical to XY plane while moving relatively to a work within XY plane. The travelling vertical wire electrode is a tool for electrical discharge machining. A machining fluid, such as water with high specific resistance, is supplied to a machining gap. In order to generate one electrical discharge for a predetermined duration ("ON time"), a voltage pulse is applied to the machining gap. A current flows through the machining gap due to the generation of an electrical discharge, and a small amount of material is removed from the work. The machining fluid washes away a machined chip and cools down the wire electrode.

When a predetermined OFF time is passed after the ON time is finished, the voltage pulse is applied to the machining gap again to generate the next electrical discharge. Thus, a series of current pulses is supplied to the machining gap. The ON time and the OFF time are very short and only a small amount of material is removed from the work by one electrical discharge. A wire electrical discharge machining device for machining the work like a coping saw is suitable to precision machining.

A typical wire electrode has a diameter of 0.1 mm to 0.3 mm. The wire electrode is usually transported to a pulling device via a plurality of pulleys and a pair of the wire guides from a wire bobbin. A pair of the wire guides is arranged above and below with respect to the work. The pulling device is controlled to maintain a traveling speed of the wire electrode at a set value. A tension applying device is located in a wire transportation path. The wire electrical discharge machining device controls the tension applying device and maintains a tension applied to the wire electrode at a set value. The tension of the wire electrode is, for example, set according to a diameter and a material of the wire electrode. If the tension is set to a large value, the wire electrode being substantially straight is ensured between the pair of the wire guides. The wire electrode being substantially straight contributes to high machining accuracy. However, an unduly large tension may cause undesirable breakage (wire breakage) of the wire electrode. Unduly large energy for electrical discharge machining is also easy to cause wire breakage.

The patent document 1 and the patent document 2 disclosed a wire electrical discharge machining device for surely maintaining a tension of a wire electrode at a set value.

PRIOR ART DOCUMENTS

Patent Documents

Patent Document 1: Japanese Patent-Laid Open No. 2003-266247
Patent Document 2: Japanese Patent-Laid Open No. H10-309631

SUMMARY OF THE INVENTION

In many cases, a tension on the wire electrical discharge machining has been set to a sufficiently large value in order to maintain high machining accuracy. Energy for the electrical discharge machining determines a material removal rate, that is, a machining efficiency. However, the energy for the electrical discharge machining has been suppressed in order to prevent wire breakage. The energy for the electrical discharge machining is mainly determined by the machining conditions for a current pulse, such as a current peak Ip, ON-time and OFF time. It is considered that generating a current pulse with a large peak current to a high frequency contributes to high-speed machining.

In one embodiment, the present invention is to provide a wire electrical discharge machining device which can improve a material removal rate while preventing wire breakage. In addition, the other object of the present invention is to provide a wire electrical discharge machining device which can improve a material removal rate without losing machining accuracy. In order to achieve the above-mentioned objects, a wire electrical discharge machining device of the present invention includes a tension controller for controlling a set tension of a wire electrode according to a wire breaking tension at which the wire electrode breaks.

The present invention relates to a wire electrical discharge machining device, which has a tension controller for maintaining a tension of a travelling wire electrode at a set tension and is for machining a work by repeatedly supplying a current pulse to a machining gap formed between the wire electrode and the work. The tension controller includes an allowed tension calculation module for calculating an allowed tension that is less than a wire breaking tension at which the wire electrode breaks, and a set tension generation module or generating the set tension according to the allowed tension.

When the set tension is less than the allowed tension, the set tension generation module can increase the set tension in such a way that the set tension does not exceed the allowed tension. The tension is increased to a degree at which the wire electrode does not break; therefore, a very straight wire electrode can be obtained.

When the set tension is greater than the allowed tension, the set tension generation module can reduce the set tension in such a way that the set tension does not go below a predetermined lower limit. The predetermined lower limit can be determined according to machining accuracy, for example. The tension is reduced to a degree at which machining accuracy is not decreased; therefore, wire breakage can be prevented without losing machining accuracy.

The tension controller can further include a wire breaking risk determination module for determining a wire breaking risk, and a margin generation module for generating a margin based on the wire breaking risk. The allowed tension calculation module calculates the allowed tension by subtracting the margin from the wire breaking tension. The wire breaking risk is determined according to a pressure of a machining fluid supplied to the machining gap (3), for example. Even if the fluid pressure decreases sharply due to a breakdown or a shape of the work, and the wire breaking risk is increased, the tension controller can decrease the wire breaking risk promptly.

The wire electrical discharge machining device of the present invention calculates the allowed tension based on the wire breaking tension at which the wire electrode breaks, and changes the set tension to the allowed tension; therefore, wire breakage can be effectively prevented. In addition, energy for electrical discharge machining is not necessary to be unduly limited from the point of view of the wire breakage; therefore, a material removal rate can be improved.

DESCRIPTION OF PREFERRED EMBODIMENTS

Figure 1:
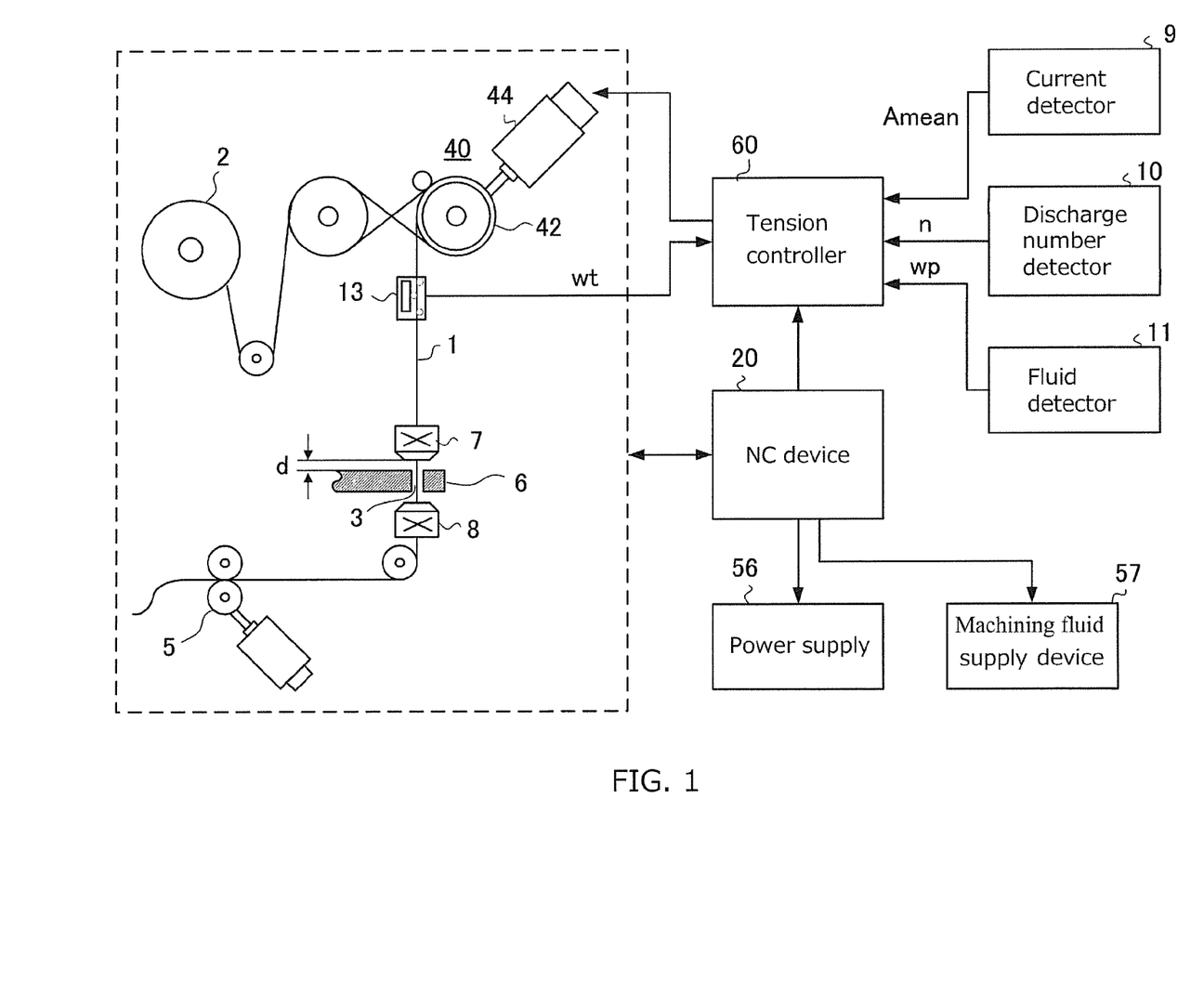
FIG. 1 is front view illustrating a wire electrical discharge machining device of the present invention.

Referring to FIG. 1, a wire electrical discharge machining device of the present invention is described. A wire electrode 1 is transported from a wire reel 2 to a pulling device 5 via a wire transportation path. A tension applying device 40, a tension detector 13, a pair of nozzles 7, 8 and a plurality of pulleys are located on the wire transportation path. The tension applying device 40 applies a tension for maintaining a straightness of the wire electrode 1 to the wire electrode 1. The tension applying device 40 includes a break pulley 42 to provide a friction to the wire electrode 1 and a servomotor 44 connected to the break pulley 42. The tension detector 13 comprises, for example, a strain gauge, and located between the break pulley 42 and the upper side nozzle 7.

The nozzles 7, 8 for injecting a machining fluid to a work 6 are located above and below with the work 6 therebetween. A machining gap 3 is formed between the wire electrode 1 and the work 6. In high-speed machining, the nozzles 7, 8 are disposed in a manner that a distance d between the nozzles 7, 8 and the work 6 becomes very small. The nozzles 7, 8 accommodate each of the wire guides (not shown) for supporting the wire electrode 1 with high accuracy. A fluid pressure detector 11 for detecting a pressure of the machining fluid injected into the machining gap 3 is disposed on each of the nozzles 7, 8. The pulling device 5 includes a pair of pulleys and a motor connected to one of the pair of pulleys. A rotational speed of the motor in the pulling device 5 is determined according to a set value WS of a travelling speed of the wire electrode 1.

The wire electrical discharge machining device includes a power supply 56, a machining fluid supply device 57, a tension controller 60 and a numerical control (NC) device 20. The power supply 56 is disposed for supplying a series of current pulses to the machining gap 3. The machining fluid supply device 57 is disposed for supplying the machining fluid to the nozzles 7, 8. The tension controller 60 controls the servomotor 44 in the tension applying device 40. The wire electrical discharge machining device further includes a current detector 9 and a discharge number detector 10. The current detector 9 detects a current ("gap current") flowing through the machining gap 3, and calculates an average of the gap currents at a predetermined time interval, for example, per 1 ms. The discharge number detector 10 detects a number of the electrical discharges generated in the machining gap 3 at a predetermined time interval, for example, per 1 ms.

The NC device 20 includes an input device (such as a keyboard, a mouse and a touch panel, etc.), a processor and a memory. NC program and set machining conditions are stored into the memory. The NC device decodes the NC program and controls a plurality of the motors which moves the wire electrode 1 against the work 6. The NC device 20 supplies a control signal to the power supply 56 and the machining fluid supply device 57 according to the set machining conditions. The machining conditions are, for example, a peak value Ip of the current pulse, a fluid pressure WP, a tension WT of the wire electrode and a travelling speed WS. The machining conditions also include a diameter of the wire electrode 1 and a material and a thickness of the work 6. The NC device 20 supplies the tension WT of the wire electrode 1 and the travelling speed WS to the tension controller 60.

Figure 2:
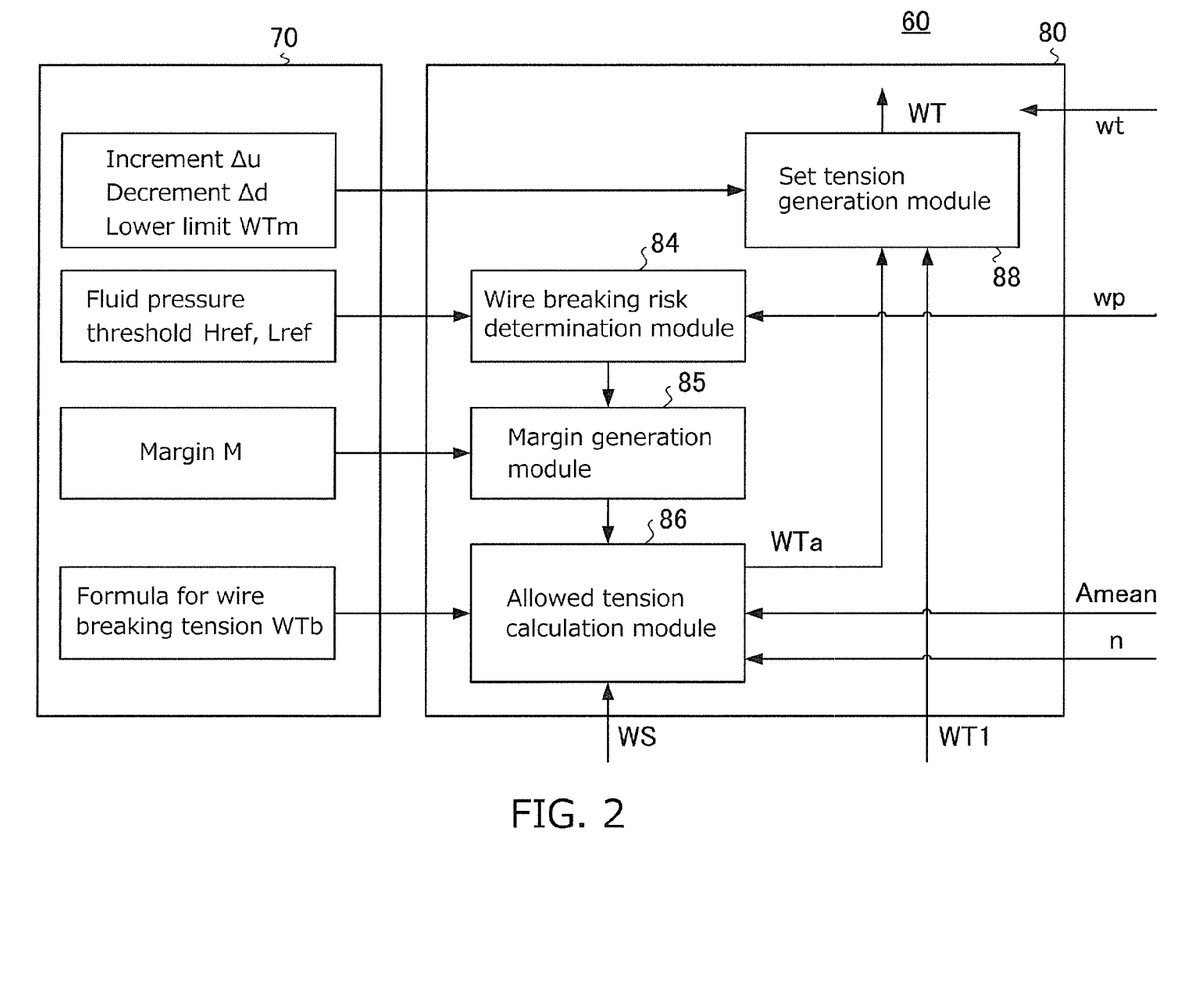
FIG. 2 is a block diagram illustrating an example of a tension controller in FIG. 1.

As shown in FIG. 2, the tension controller 60 has a memory 70 and a processing device 80. The memory 70 stores a formula to calculate a wire breaking tension WTb, thresholds of the fluid pressure Href, Lref, a margin M, a lower limit WTm, an increment $\Delta\mu$ and a diminution $\Delta d$. The wire breaking tension WTb is a tension at which the wire electrode 1 breaks, and is calculated by Formula 1.

$$WTb = A1 \times Amean/(n \times s) + B1 \qquad \text{[Formula 1]}$$

Amean: average gap current
n: number of the electrical discharge
s: cross-sectional area of used wire electrode
A1: slope (proportionality factor)
B1: intercept The variables of Formula 1 are the average gap current Amean, the number of the electrical discharge n and the cross-sectional area s. The average gap current Amean is an average of the gap currents. The number of the electrical discharge is a number of the electrical discharge generated in the machining gap 3 at a predetermined time, that is, a number of the current pulse. The cross-sectional area s is a cross-sectional area of the wire electrode 1 passed through the machining gap 3 during machining. In other words, the cross-sectional area s is a cross-sectional area of a used wire electrode for electrical discharge machining. In Formula 1, the average gap current Amean is divided by the number of the electrical discharge n and the cross-sectional area s. Formula 1 for calculating the wire breaking tension WTb is different depending on a thickness of the work 6.

Figure 3:
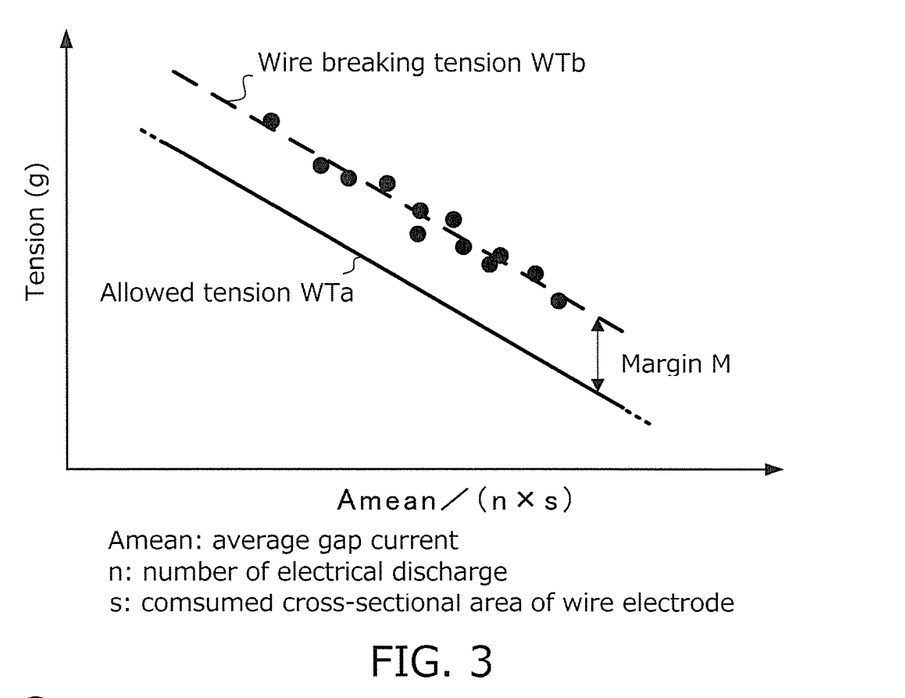
FIG. 3 is a graph diagram plotting a wire breaking tension at which a wire electrode breaks.

The inventor clarified by the experiment that the wire breaking tension WTb decreases according to an increase of the value Amean/(n×s) as shown FIG. 3. The cross-sectional area s of a used wire electrode is calculated by (cross-sectional area of an unused wire electrode)−(consumption Δs by electrical discharge machining). The consumption Δs by electrical discharge machining is calculated by Formula 2.

$$\Delta s = A2 \times A\mathrm{mean}/WS - B2 \quad \text{[Formula 2]}$$

Figure 4:
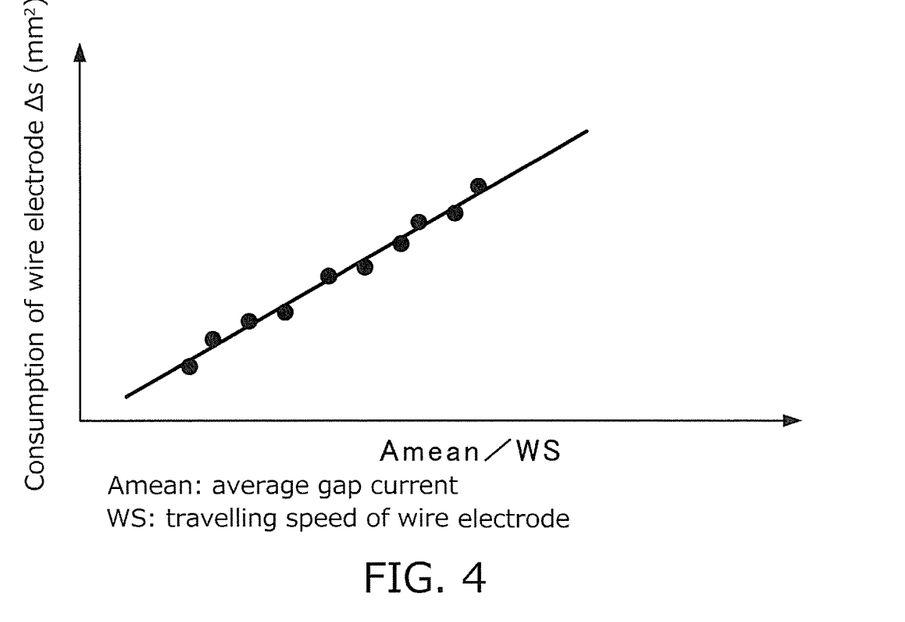
FIG. 4 is a graph diagram plotting a consumption of the wire electrode.

Amean: average gap current
WS: wire travelling speed
A2: slope (proportionality factor)
B2: intercept The variables of Formula 2 include the average gap current Amean and the wire travelling speed WS. The wire travelling speed WS is a speed when the wire electrode 1 is travelling along the wire transportation path and is represented by m/minutes. The inventor clarified by the experiment that the consumption Δs by electrical discharge machining increases according to an increase of the value Amean/WS as shown in FIG. 4. Formula 2 for calculating the consumption Δs by electrical discharge machining is different depending on a diameter of the wire electrode 1 and a material and a thickness of the work 6.

The first threshold value Href is greater than the second threshold value Lref. The first threshold value Href is 90% of the set fluid pressure WP, and the second threshold value Lref is 50% of the set fluid pressure WP. The threshold values Href, Lref are used to classify a wire breaking risk into three levels of "low", "high" and "very high". Corresponding to the three levels of "low", "high" and "very high" of the wire breaking risk, three margins of M1, M2 and M3 are stored.

The lower limit WTm is determined according to necessary machining accuracy. When the tension is lower than the lower limit WTm, the necessary machining accuracy cannot be satisfied. The increment Δμ and the diminution Δd of the tension are range to change the tension of the wire electrode 1 to the allowed tension WTa. A rapid change of the tension may be an undesirable disturbance for tension control. Therefore, the increment Δμ is a small value in order to increase the tension in stages. The diminution Δd is a large value in order to promptly avoid wire breakage.

The processing device 80 includes a wire breaking risk determination module 84, a margin generation module 85, an allowed tension calculation module 86 and a set tension generation module 88. The wire breaking risk determination module 84 reads the threshold values Href, Lref of the fluid pressure from the memory 70. The fluid pressure detector 11 detects each of the fluid pressures in the nozzles 7, 8 and supplies the detected fluid pressure wp to the wire breaking risk determination module 84. The wire breaking risk determination module 84 compares the fluid pressure wp with the threshold values Href, Lref.

Figure 5:
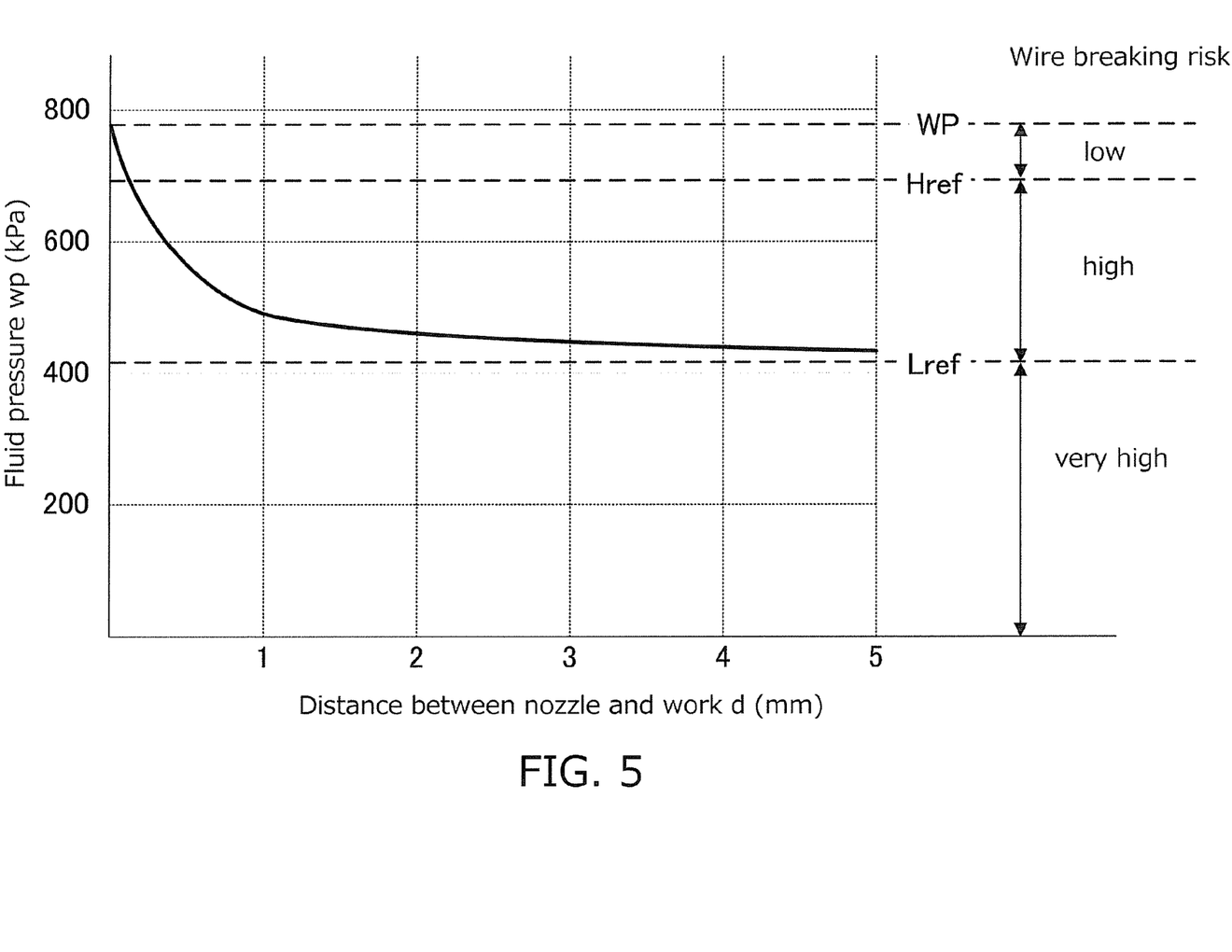
FIG. 5 is a graph diagram plotting a pressure of a machining fluid supplied to a machining gap.

When the pressure of the machining fluid supplied to the machining gap is maintained at a higher value WP, the wire breaking risk is reduced. As shown in FIG. 5, when the distance d between nozzles 7, 8 and the work 6 is small, the detected fluid pressure wp is maintained at an approximately set value. In most high-speed machining, the distance d is maintained at a value as small as possible. However, when the distance d becomes larger due to, for example, a shape of the work 6, the detected fluid pressure wp becomes less than the threshold value Href and a wire breaking risk is increased. In addition, when the fluid pressure wp becomes less than the threshold value Lref due to, for example, a breakdown or a shape of the work 6, a wire breaking risk is extremely increased due to an insufficient cooling of the wire electrode 1.

The wire breaking risk determination module 84 classifies the wire breaking risk based on the pressure wp of the machining fluid injected into the machining gap 3. When the detected fluid pressure wp is greater than the first threshold value Href, the wire breaking risk is classified as "low" level. When the detected fluid pressure wp is less than the first threshold value Href and greater than the second threshold value Lref, the wire breaking risk is classified as "high" level. When the detected fluid pressure wp is less than the second threshold value Lref, the wire breaking risk is classified as "very high" level.

A data indicating the wire breaking risk is supplied to the margin generation module 85. The margin generation module 85 for generating a margin reads the margin M selectively according to the wire breaking risk from the memory 70. When the wire breaking risk is "low", a first margin M1 is generated. When the wire breaking risk is "high", a second margin M2 which is greater than the first margin M1 is generated. When the wire breaking risk is "very high", a third margin M3 which is greater than the second margin M2 is generated. The margin M is supplied to the allowed tension calculation module 86.

The NC device 20 supplies the set machining conditions to the allowed tension calculation module 86. The machining conditions include the diameter of the wire electrode 1, the material and the thickness of the work 6 and the wire travelling speed WS. The current detector 9 supplies the average gap current Amean to the allowed tension calculation module 86. The discharge number detector 10 supplies the number of the electrical discharge to the allowed tension calculation module 86. The allowed tension calculation module 86 selectively reads a formula for calculating the wire breaking tension WTb from the memory 70 based on the diameter of the wire electrode 1 and the material and the thickness of the work 6. The allowed tension calculation module 86 calculates the cross-sectional area s of the used wire electrode by calculating the consumption Δs of the wire electrode based on Formula 2. Moreover, the allowed tension calculation module 86 calculates the allowed tension WTa by subtracting the margin M from the wire breaking tension WTb. The allowed tension WTa is the maximum value of the tension at which the wire electrode 1 does not break. One example of the allowed tension WTa is shown in FIG. 3. The allowed tension WTa is supplied to the set tension generation module 88.

The NC device 20 supplies an initial set tension WT1 to the set tension generation module 88. The initial set tension WT1 is a tension which is enough to ensure the wire electrode 1 being straight. Accordingly, it is not necessary to make the tension to be greater than the initial set tension WT1 so that the initial set tension WT1 is an upper limit of the tension. The tension controller 60 controls the tension of the wire electrode 1 within a range from the upper limit WT1 to the lower limit WTm. The set tension generation module 88 generates the set tension WT according to the allowed tension WTa.

Figure 6:
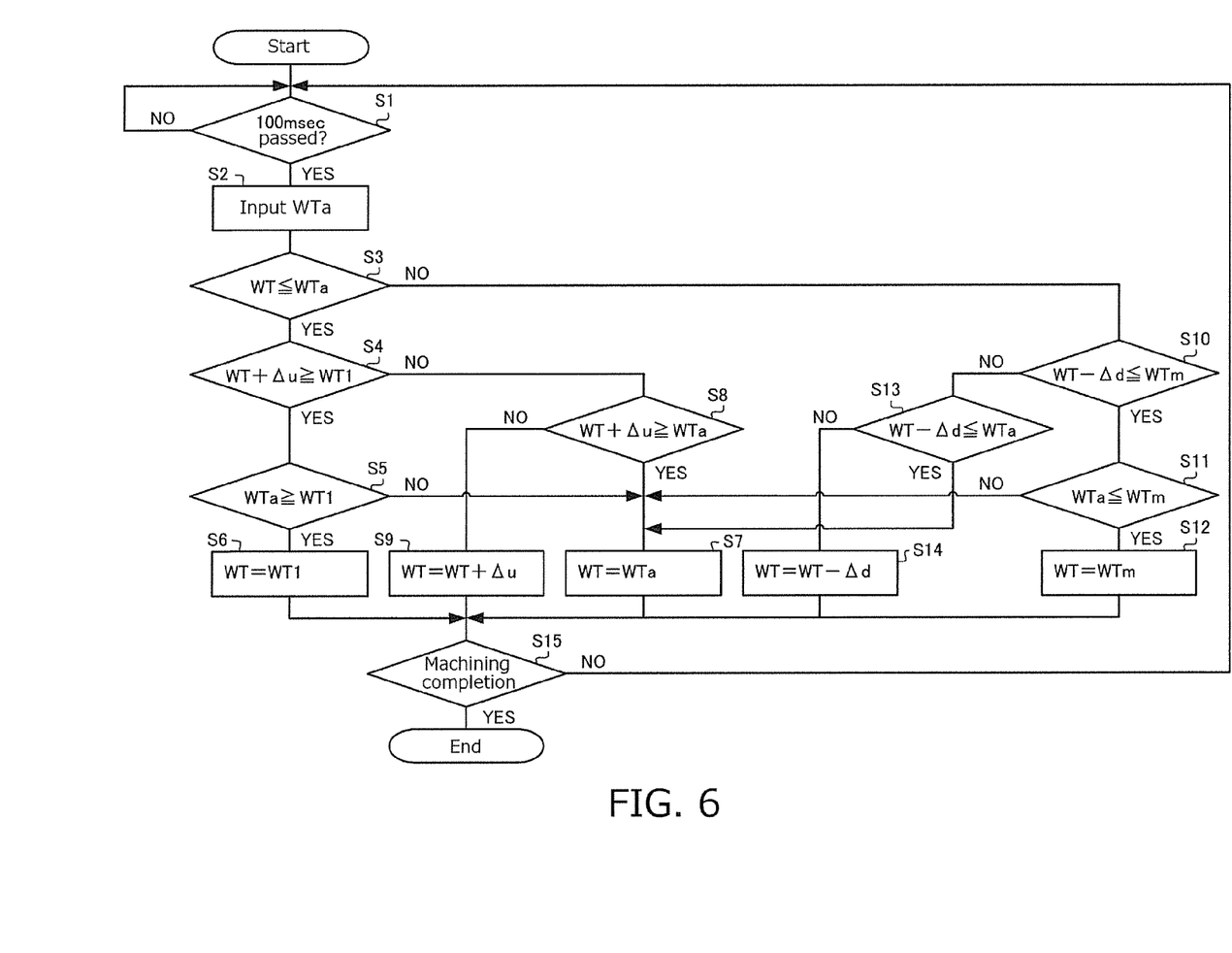
FIG. 6 is a flowchart illustrating an example of a process when a set tension generation module generates a set tension.

Referring to FIG. 6, one example of a process when the set tension generation module 88 generates the set tension WT is described. This process is suitable for high-speed electrical discharge machining. After the tension controller 60 received an executive instruction from an operator and started electrical discharge, the process is executed. When starting the process, the set tension WT is equal to the initial set tension WT1. After passing 100 ms in Step S1, the set tension generation module 88 inputs the allowed tension WTa in Step S2. When the current set tension WT is less than or equal to the allowed tension WTa in Step S3, the process goes to Step S4.

When the value WT+Δu is greater than or equal to the upper limit WT1 in Step S4, the process goes to Step S5. If not, the process goes to Step S8. When the allowed tension WTa is greater than or equal to the upper limit WT1 in Step S5, the set tension WT becomes the upper limit WT1 in Step S6. If not, the set tension WT becomes the allowed tension WTa in Step S7. Thus, the set tension generation module 88 increases the set tension WT in such a way that the set tension does not exceed the upper limit WT1.

When the value WT+Δu is greater than or equal to the allowed tension WTa in Step S8, the set tension WT becomes the allowed tension WTa in Step S7. If not, the set tension WT is increased to the value WT+Δu in Step S9. Thus, the set tension generation module 88 increases the set tension WT in such a way that the set tension does not exceed the allowed tension WTa. The increment Δμ is a small value to a degree that prevents changing the tension rapidly.

When the current set tension WT is greater than the allowed tension WTa in Step S3, the process goes to Step S10. When the value WT−Δd is less than or equal to the lower limit WTm in Step S10, the process goes to Step S11. If not, the process goes to Step S13. When the allowed tension WTa is less than or equal to the lower limit WTm in Step S11, the set tension WT becomes the lower limit WTm in Step S12. If not, the set tension WT is decreased to the allowed tension WTa in Step S7. Thus, the set tension generation module 88 decreases the set tension WT in such a way that the set tension does not go below the lower limit WTm.

When the value WT−Δd is less than or equal to the allowed tension WTa in Step S13, the set tension WT is decreased to the allowed tension WTa in Step S7. If not, the set tension WT is decreased by Δd in Step 14. The decrement Δd is greater than the increment Δu because it decreases the wire breaking risk which was increased rapidly. Accordingly, the set tension generation module 88 significantly decreases the set tension WT when the allowed tension WTa becomes well below the set tension WT. If the machining is completed in Step 15 following Step S6, S7, S9, S12 or S14, the process ends. If not, the process returns to Step S1.

The tension detector 13 supplies the detected tension wt to the tension controller 60. The tension controller 60 for maintaining the tension of the wire electrode 1 at the set tension WT supplies a command signal of a rotational speed to the servomotor 44 according to a deviation between the detected tension wt and the set tension WT.

The present invention is not limited to the illustrated examples. It should be apparent to those skilled in the art that various changes and modifications to the structure of the invention may be made without departing from the spirit and scope of the invention. For example, the container for containing the cooling liquid includes a tube which allows the cooling liquid to circulate. The purpose of the present invention is to cover the modifications and variations of this invention provided they come within the scope of the appended claims and their equivalents.

The invention claimed is:

1. A wire electrical discharge machining device, comprising a tension controller for maintaining a tension of a travelling wire electrode at a set tension and machining a work by repeatedly supplying a current pulse to a machining gap formed between the wire electrode and the work, and a current detector for detecting a gap current flowing through the machining gap, the tension controller comprising a plurality of modules which are stored in a memory of the tension controller and are executable by a processor of the tension controller, the plurality of modules comprising:
 an allowed tension calculation module for calculating an allowed tension that is less than a wire breaking tension at which the wire electrode breaks, wherein the allowed tension calculation module calculates the wire breaking tension based on the gap current; and
 a set tension generation module for generating the set tension according to the allowed tension,
 wherein the allowed tension calculation module calculates the wire breaking tension based on a cross-sectional area of a used wire electrode,
 wherein the allowed tension calculation module calculates the cross-sectional area of the used wire electrode by subtracting consumption by electrical discharge machining from a cross-sectional area of an unused wire electrode,
 wherein the allowed tension calculation module calculates the consumption based on a travelling speed of the wire electrode and the gap current.

2. The wire electrical discharge machining device according to claim 1, when the set tension is less than the allowed tension, the set tension generation module increases the set tension.

3. The wire electrical discharge machining device according to claim 2, when the set tension is less than the allowed tension, the set tension generation module increases the set tension in such a way that the set tension does not exceed the allowed tension.

4. The wire electrical discharge machining device according to claim 1, when the set tension is greater than the allowed tension, the set tension generation module reduces the set tension.

5. The wire electrical discharge machining device according to claim 4, when the set tension is greater than the allowed tension, the set tension generation module reduces the set tension in such a way that the set tension does not go below a predetermined lower limit.

6. The wire electrical discharge machining device according to claim 1, when the set tension is less than the allowed tension, the set tension generation module increases the set tension by a first predetermined increment, and when the set tension is greater than the allowed tension, the set tension generation module reduces the set tension by a second predetermined decrement which is greater than the predetermined increment.

7. The wire electrical discharge machining device according to claim 1, further comprising a discharge number detector for detecting a number of electrical discharges generated in the machining gap at a predetermined time interval, wherein the allowed tension calculation module calculates the wire breaking tension based on the number of electrical discharges.

8. The wire electrical discharge machining device according to claim 1, wherein the allowed tension calculation module calculates the allowed tension by subtracting a margin from the wire breaking tension.

9. The wire electrical discharge machining device according to claim 8, further comprising a wire breaking risk determination module for determining a wire breaking risk, and a margin generation module for generating the margin based on the wire breaking risk.

10. The wire electrical discharge machining device according to claim 9, wherein the wire breaking risk determination module classifies the wire breaking risk into at least a "low" level and a "high" level, and the margin generation module generates a first margin when the wire breaking risk is at the "low" level and the margin generation module generates a second margin which is greater than the first margin when the wire breaking risk is at the "high" level.

11. The wire electrical discharge machining device according to claim 9, further comprising an injection nozzle for supplying a machining fluid to the machining gap and a fluid pressure detector for detecting a pressure of the machining fluid, wherein the wire breaking risk determination module determines the wire breaking risk according to the pressure.

12. The wire electrical discharge machining device according to claim 11, wherein the wire breaking risk determination module classifies the wire breaking risk into a "low" level when the pressure is greater than or equal to a first threshold value, and the wire breaking risk determination module classifies the wire breaking risk into a "high" level when the pressure is less than the first threshold value.

13. The wire electrical discharge machining device according to claim 12, wherein the margin generation module generates a first margin when the wire breaking risk is at the "low" level and the margin generation module generates a second margin which is greater than the first margin when the wire breaking risk is at the "high" level.

14. The wire electrical discharge machining device according to claim 12, wherein the wire breaking risk determination module classifies the wire breaking risk into a "very high" level when the pressure is less than a second threshold value which is less than the first threshold value.

15. The wire electrical discharge machining device according to claim 14, wherein the margin generation module generates a first margin when the wire breaking risk is at the "low" level, the margin generation module generates a second margin which is greater than the first margin when the wire breaking risk is at the "high" level, and the margin generation module generates a third margin which is greater than the second margin when the wire breaking risk is at the "very high" level.

* * * * *